United States Patent
Moody et al.

(10) Patent No.: US 7,302,253 B2
(45) Date of Patent: Nov. 27, 2007

(54) COORDINATION OF RINGTONES BY A TELECOMMUNICATIONS TERMINAL ACROSS MULTIPLE TERMINALS

(75) Inventors: Taryn Moody, Atlantic Highlands, NJ (US); Doree Duncan Seligmann, New York, NY (US)

(73) Assignee: Avaya Technologies Corp, Basking Ridge, NJ (US)

( * ) Notice: Subject to any disclaimer, the term of this patent is extended or adjusted under 35 U.S.C. 154(b) by 148 days.

(21) Appl. No.: 10/915,500

(22) Filed: Aug. 10, 2004

(65) Prior Publication Data

US 2006/0040647 A1 Feb. 23, 2006

(51) Int. Cl.
*H04M 1/663* (2006.01)

(52) U.S. Cl. .................. 455/412.2; 455/466; 455/417; 455/458; 455/459; 455/567

(58) Field of Classification Search ............. 455/412.2, 455/417, 458, 459, 567
See application file for complete search history.

(56) References Cited

U.S. PATENT DOCUMENTS

| | | | |
|---|---|---|---|
| 5,371,781 A | | 12/1994 | Ardon |
| 5,960,367 A | * | 9/1999 | Kita ........................... 455/567 |
| 5,966,656 A | * | 10/1999 | Elkin et al. ................. 455/421 |
| 6,018,654 A | * | 1/2000 | Valentine et al. ......... 455/414.4 |
| 6,366,791 B1 | * | 4/2002 | Lin et al. .................... 455/567 |
| 6,418,330 B1 | * | 7/2002 | Lee ............................ 455/567 |
| 6,427,076 B2 | * | 7/2002 | Skog .......................... 455/433 |
| 6,748,320 B2 | * | 6/2004 | Jones ......................... 701/201 |
| 6,760,704 B1 | * | 7/2004 | Bennett ...................... 704/270 |
| 6,947,893 B1 | * | 9/2005 | Iwaki et al. ................. 704/258 |
| 6,979,767 B2 | * | 12/2005 | Georges et al. ............... 84/609 |
| 7,016,707 B2 | * | 3/2006 | Fujisawa et al. ............ 455/567 |
| 2002/0032020 A1 | * | 3/2002 | Brown et al. ................ 455/414 |
| 2002/0077091 A1 | * | 6/2002 | Immonen et al. ........... 455/417 |
| 2002/0123328 A1 | * | 9/2002 | Snip et al. ................... 455/413 |
| 2002/0178012 A1 | * | 11/2002 | Wang et al. ................. 704/503 |
| 2002/0181415 A1 | * | 12/2002 | West et al. .................. 370/312 |
| 2003/0017860 A1 | * | 1/2003 | Choi ........................... 455/567 |
| 2003/0133423 A1 | * | 7/2003 | LaDue ........................ 370/330 |
| 2003/0205125 A1 | * | 11/2003 | Futamase et al. ............. 84/622 |
| 2004/0066932 A1 | * | 4/2004 | Seligmann ............. 379/373.01 |
| 2004/0089141 A1 | * | 5/2004 | Georges et al. ............... 84/609 |
| 2004/0204153 A1 | * | 10/2004 | Benco et al. ................ 455/567 |
| 2005/0107128 A1 | * | 5/2005 | Deeds ......................... 455/567 |
| 2005/0136976 A1 | | 6/2005 | Shoemake |

FOREIGN PATENT DOCUMENTS

| | | |
|---|---|---|
| EP | 0851649 A2 | 7/1988 |
| EP | 1255418 A2 | 11/2002 |

\* cited by examiner

*Primary Examiner*—Lester G. Kincaid
*Assistant Examiner*—Diego Herrera
(74) *Attorney, Agent, or Firm*—DeMont & Breyer LLC

(57) ABSTRACT

An apparatus and methods are disclosed for enabling multiple telecommunications terminals that are associated with a common user to notify their user of the arrival of an incoming message via a ringtone, where the ringtone is: (i) coordinated across the terminals, and (ii) customized for each terminal based on one or more attributes of the terminal. In particular, in the illustrative embodiments a coordinating terminal that receives a message also directed to another telecommunications terminal sets the values of one or more properties of a ringtone (e.g., tempo, timbre, pitch, rhythm, etc.) based on one or more attributes of the other telecommunications terminal (e.g., terminal type, etc.).

27 Claims, 10 Drawing Sheets

COORDINATION OF RINGTONES BY A TELECOMMUNICATIONS TERMINAL ACROSS MULTIPLE TERMINALS

FIELD OF THE INVENTION

The present invention relates to telecommunications in general, and, more particularly, to techniques for intelligently notifying the user of a telecommunications terminal of the arrival of a message.

BACKGROUND OF THE INVENTION

FIG. 1 depicts telecommunications system 100 that comprises telecommunications terminals 105-j (e.g., a wireless telephone, a laptop computer with softphone capability, etc.), for j=1 to 2, and network 120 (e.g., the Public Switched Telephone Network [PSTN], a cellular wireless network, a wireless local-area network, etc.) in the prior art. Telecommunications terminal 105-j is capable of receiving messages (e.g., incoming voice call notifications, email messages, Short Message Service [SMS] messages, Multimedia Message Service [MMS] messages, Instant Messaging [IM] messages, etc.) that originate from other telecommunications terminals via network 120.

When telecommunications terminal 105-j receives a message, it notifies its user of the message's arrival—or of the associated incoming call if one is occurring—by playing a "ringtone" (e.g., a tune, a series of beeps, etc.) via speaker 110-j; by displaying visual information (e.g., text, an image, etc.) via display 111-j (if present); or by vibrating the terminal via vibration mechanism 112-j (if present), alone or in combination. Telecommunications terminal 105-j might play a particular ringtone for all incoming messages, or a ringtone that is associated with a category of callers (e.g., a ringtone for business contacts, a ringtone for friends, a ringtone for family members, etc.), or a ringtone that is associated with an individual caller, etc. Similarly, telecommunications terminals 105-1 and 105-2 might display a text message (e.g., "Incoming Call", "Incoming Call: Mom", "Incoming Call: 212-555-1234", etc.) or an image (e.g., an animated icon of a ringing telephone, a photo of the caller, etc.), or both, to indicate that there is an incoming message.

SUMMARY OF THE INVENTION

The present invention enables multiple telecommunications terminals that are associated with a common user to notify their user of the arrival of an incoming message via a ringtone, where the ringtone is: (i) coordinated across the terminals, and (ii) customized for each terminal based on one or more attributes of the terminal. In the illustrative embodiments, a telecommunications terminal, known as the "primary terminal," receives a message that is directed to the primary terminal and possibly to other telecommunications terminals that are also associated with the same user. For each of the telecommunications terminals to which the message is directed, the primary terminal sets the values of one or more properties of a ringtone (e.g., tempo, timbre, pitch, rhythm, etc.) to be played at the terminal based on one or more attributes of that particular terminal (e.g., terminal type, etc.). For example, if a user's three telecommunications terminals play the Beatles song "Hello Goodbye" when a message arrives that indicates an incoming call, the song might be played in a different fashion at each terminal, depending on the attributes of each terminal:

as a piano version on the first terminal (a cellular phone), a harpsichord version on the second terminal (a softphone), and an orchestral version on the third terminal (a hardphone), using a lower octave on the first terminal, a middle octave on the second terminal, and an upper octave on the third terminal, or with lyrics sung in English on the first terminal, in German on the second terminal, and in Korean on the third terminal.

As another example, if the user selects a standard ring, the ring might have distinguishing tonality characteristics that are different on each terminal. As will be appreciated by those skilled in the art, modifying the values of properties such as timbre and pitch does not change the fundamental identity of the song or sound effect. In other words, the melody of the song is independent of these properties and thus the song remains recognizable.

In the first illustrative embodiment, when the primary terminal receives a message that is directed to one or more telecommunications terminals, the primary terminal transmits to each terminal a signal that represents an instance of a musical composition (e.g., an audio clip, a Musical Instrument Digital Interface [MIDI] file, etc.) along with the message. The values of one or more musical properties of the musical composition instance (e.g., tempo, volume, pitch, rhythm, etc.) are established based on one or more attributes of each telecommunications terminal (e.g., the terminal's type, the terminal's size, the terminal speaker's size, the terminal's ranking in terms of user preference, etc.) that is associated with a particular user. Subsequently, when each terminal receives the incoming message, the terminal plays a ringtone that comprises the instance of the musical composition that was received from the primary terminal.

In the second illustrative embodiment, the primary terminal determines musical property values (e.g., instrument is piano, first note is middle C, vocal language is Korean, etc.) based on one or more attributes of each telecommunications terminal that is associated with the particular user, and sends the property values, but not an instance of the musical composition, to each telecommunications terminal. Then, when each terminal receives the incoming message, it plays a ringtone that comprises the musical composition stored at the terminal in accordance with the received property values.

In both illustrative embodiments, when the user has selected a non-acoustic alert mode (e.g., visual, vibrational, etc.) on a first terminal, the other terminals associated with the user are updated to use alert modes that are consistent with that of the first terminal. For example, if a first terminal is put in a vibrational alert mode with its speaker muted, the other terminals' speakers are also muted and those terminals are put in a vibrational mode, a visual mode, or a combination of the two.

In some embodiments, the values of one or more musical properties of the instance of the musical composition, such as tempo, volume, pitch, rhythm, etc., are also established based on one or more attributes of the incoming message.

The illustrative embodiments of the present invention are advantageous over the prior art in that they provide a global mapping between incoming calls and ringtones such that the ringtones are distinguishable across multiple terminals. Each alerting terminal is clearly recognized, regardless of how many terminals are provided with the incoming call. At the same time, the fundamental identity—and, therefore, the meaning—of the ringtone is preserved across the user's terminals.

An illustrative embodiment comprises: (a) receiving a message directed to a user of a first telecommunications terminal and with a second telecommunications terminal; and (b) transmitting: (i) the message and a first signal that represents a first instance of a musical composition to the first telecommunications terminal, and (i) the message and a second signal that represents a second instance of the musical composition to the second telecommunications terminal; wherein the second telecommunications terminal is associated with the user of the first telecommunications terminal; and wherein the first instance and the second instance are for notifying the user of the arrival of the message; and wherein the value of a first musical property of the first instance is based on an attribute of the first telecommunications terminal; and wherein the first musical property is independent of melody.

DETAILED DESCRIPTION

The terms appearing below are given the following definition for use in this Description and appended claims.

For the purposes of the specification and claims, the term "musical composition" is defined as either a piece of music or a sound effect (e.g., one or more beeps, a combination of various sounds, etc.). The musical composition constitutes a ringtone.

For the purposes of the specification and claims, the term "alert mode" is defined as the particular method of notifying a telecommunications terminal user of an incoming message or call. Methods include playing sounds through a speaker, displaying text or an image, flashing a light or icon, vibrating the terminal, etc. The alert mode can also define acceptable methods by indicating what will not be used for notifying (e.g., non-acoustic, etc.).

For purposes of the specification and claims, the term "mute status" is defined as the state of whether or not the speaker of a telecommunications terminal is turned off. If the speaker has been turned off for notifying a user of an incoming message, the mute status is "muted," while if the speaker is turned on for notifying a user of an incoming message, the mute status is "not muted."

In the illustrative embodiments described below, ringtone coordination is enabled across multiple terminals. One or more of the terminals associated with a user receive an incoming call notification message for the same call and play ringtones that all comprise the same musical composition, but with at least one property (e.g., timbre, etc.) that differs across the terminals. For example, a user with three terminals, such as those described below, might want to hear the "Batman" theme for any incoming call from the user's supervisor, but sounding like a piano at the first terminal because it is a cellular phone, a harpsichord at the second terminal because it is a softphone, and an orchestra at the third terminal because it is a hardphone.

Figure 1:
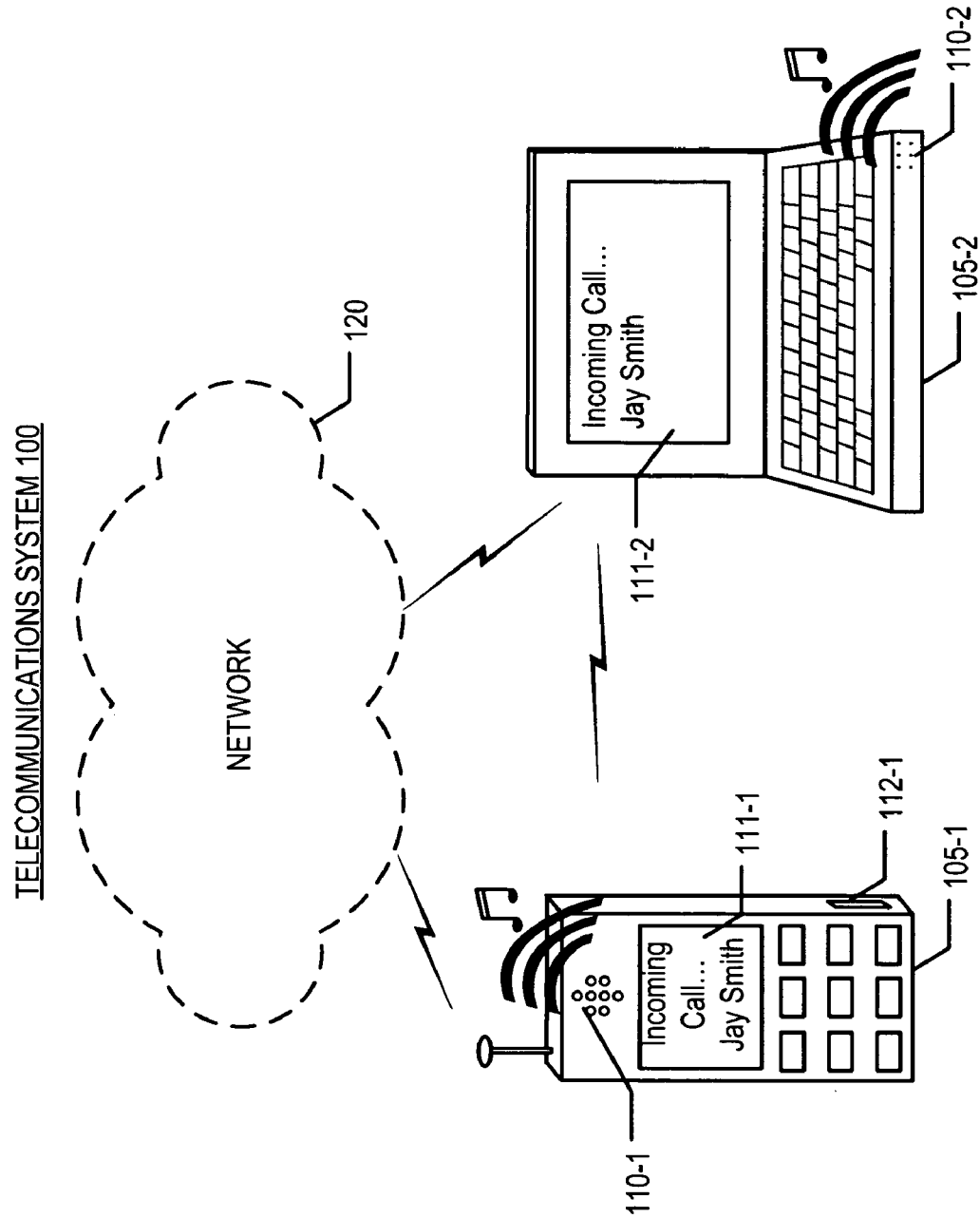
FIG. 1 depicts telecommunications system 100 in the prior art.
Figure 2:
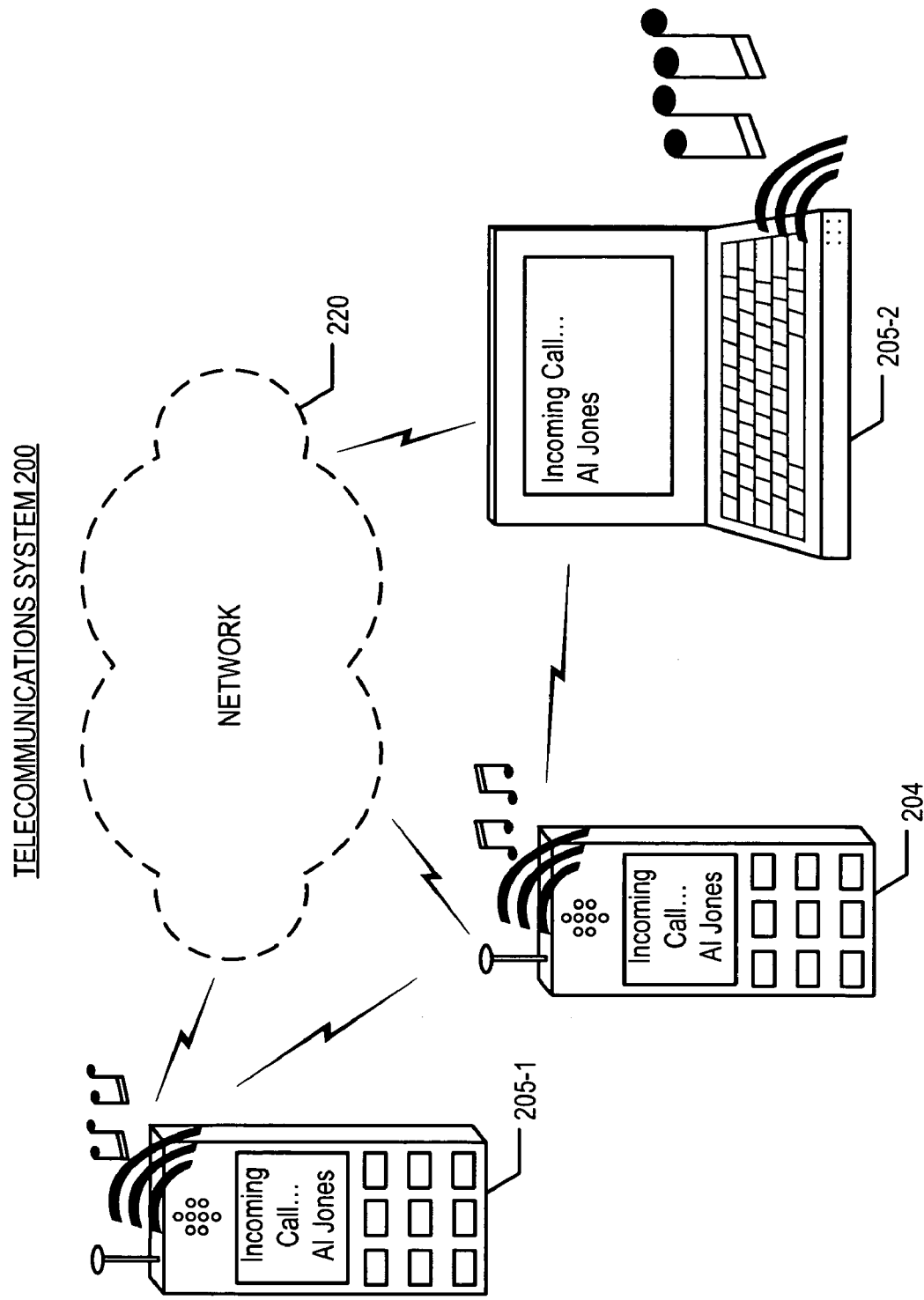
FIG. 2 depicts telecommunications system 200 in accordance with the illustrative embodiments of the present invention.

FIG. 2 depicts telecommunications system 200 in accordance with the illustrative embodiments of the present invention. Telecommunications system 200 comprises primary telecommunications terminal 204, telecommunications terminals 205-1 and 205-2, and network 220, interrelated as shown.

Primary telecommunications terminal 204 (or "primary terminal 204") is capable of receiving messages (e.g., voice telephone calls, email messages, Short Message Service [SMS] messages, etc.) from calling terminals via network 220, of exchanging information with terminal 205-j via a wireless interface (e.g., Bluetooth, Wi-Fi, etc.), and of notifying its user of the arrival of a message as described below and with respect to FIGS. 5, 6, 8, and 9.

Telecommunications terminal 205-j (or "terminal 205-j"), where j is equal to 1 or 2, is capable of receiving messages (e.g., voice telephone calls, email messages, Short Message Service [SMS] messages, etc.) from calling terminals via network 220, of exchanging information with primary terminal 204 via a wireless interface (e.g., Bluetooth, Wi-Fi, etc.), and of notifying its user of the arrival of a message as described below and with respect to FIGS. 7 and 10.

Primary terminal 204 and terminal 205-j differ in that primary terminal 204 has the added function of coordinating across the terminals associated with a user how the musical composition notifies the user of the incoming call, in accordance with the illustrative embodiments of the present invention. Primary terminal 204 is initially designated as the controlling terminal in one of a number of ways, including adding software at the factory, activating the functionality after the terminal has been purchased, etc. It will be clear to those skilled in the art, after reading this specification, how to designate a terminal as the primary (i.e., primary terminal 204).

Figure 3:
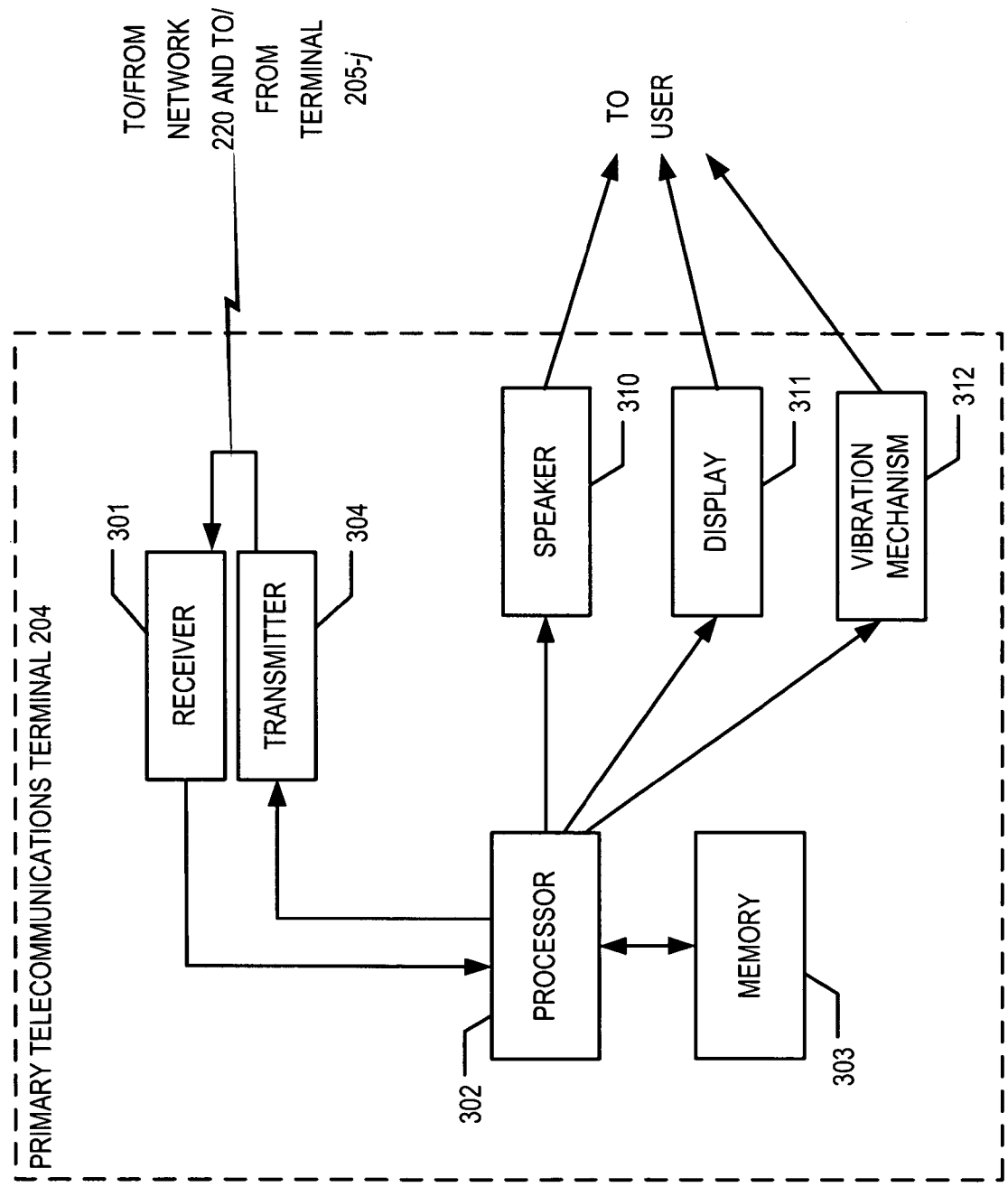
FIG. 3 depicts a block diagram of the salient components of primary telecommunications terminal 204, as shown in FIG. 2, in accordance with the illustrative embodiments of the present invention.

Primary terminal 204, terminal 205-1, and terminal 205-2 are not all of the same terminal type. For example, as depicted in FIG. 3, primary terminal 204 and terminal 205-1 are cellular phones and terminal 205-2 is a "softphone," as is known in the art, that is implemented in a laptop computer. It will be clear, however, to those skilled in the art, after reading this specification, how to make and use primary terminal 204 and terminals 205-j based on other terminal types (e.g., hardphone, Plain Old Telephone Service [or "POTS"] phone, Integrated Services Digital Network [or "ISDN"] phone, Private Branch Exchange [or "PBX"] phone, etc.). Those who are skilled in the art will also appreciate that in some alternative embodiments, primary terminal 204 and terminals 205-1 and 205-2 can all be of the same terminal type and in other alternative embodiments, they can all be different terminal types.

Although two terminals (i.e., terminals 205-1 and 205-2) are depicted as part of the illustrative embodiments in addition to primary terminal 204, it will be clear to those skilled in the art how to make and use telecommunications system 300 with a different number of terminals 205 present.

It will be clear to those skilled in the art, after reading this specification, how to make and use primary terminal 204 and terminals 205-1 and 205-2.

Network 220 is a telecommunications network that transmits messages to and from primary terminal 204 and terminal 205-j in well-known fashion. Telecommunications network 220 comprises one or more of the Internet, the Public Switched Telephone Network (PSTN), a local area network (LAN), a cellular network, etc., as are known in the art.

FIG. 3 depicts a block diagram of the salient components of primary terminal 204 in accordance with the illustrative embodiments of the present invention. As shown in FIG. 3, primary terminal 204 comprises receiver 301, processor 302, memory 303, transmitter 304, speaker 310, display 311, and vibration mechanism 312, interconnected as shown.

Receiver 301 receives signals from one or more of terminal 205-1, terminal 205-2, and network 220, and forwards the information encoded in these signals to processor 302 in well-known fashion. In some alternative embodiments, receiver 301 comprises multiple receiver units, where primary terminal 204 uses one receiver unit to communicate with terminals 205-j and another receiver unit to communicate with network 220. It will be clear to those skilled in the art, after reading this disclosure, how to make and use receiver 301.

Processor 302 is a general-purpose processor that is capable of reading data from and writing data into memory 303 and of executing the tasks described below and with respect to FIGS. 5, 6, 8, and 9. In some alternative embodiments of the present invention, processor 302 might be a special-purpose processor. In either case, it will be clear to those skilled in the art, after reading this disclosure, how to make and use processor 302.

Memory 303 stores data and executable instructions, as is well-known in the art, and might be any combination of random-access memory (RAM), flash memory, disk, drive, etc. It will be clear to those skilled in the art, after reading this specification, how to make and use memory 303.

Transmitter 304 receives information from processor 302 and transmits signals that encode this information to one or more of terminal 205-1, terminal 205-2, and network 220, in well-known fashion. In some alternative embodiments, transmitter 304 comprises multiple transmitter units, where primary terminal 204 uses one transmitter unit to communicate with terminals 205-j and uses another transmitter unit to communicate with network 220. It will be clear to those skilled in the art, after reading this specification, how to make and use transmitter 304.

Speaker 310, display 311, and vibration mechanism 312 are the same as speaker 110-1, display 111-1, and vibration mechanism 112-1, as are known in the art. In some alternative embodiments, display 311 or vibration mechanism 312 or both are not present.

Figure 4:
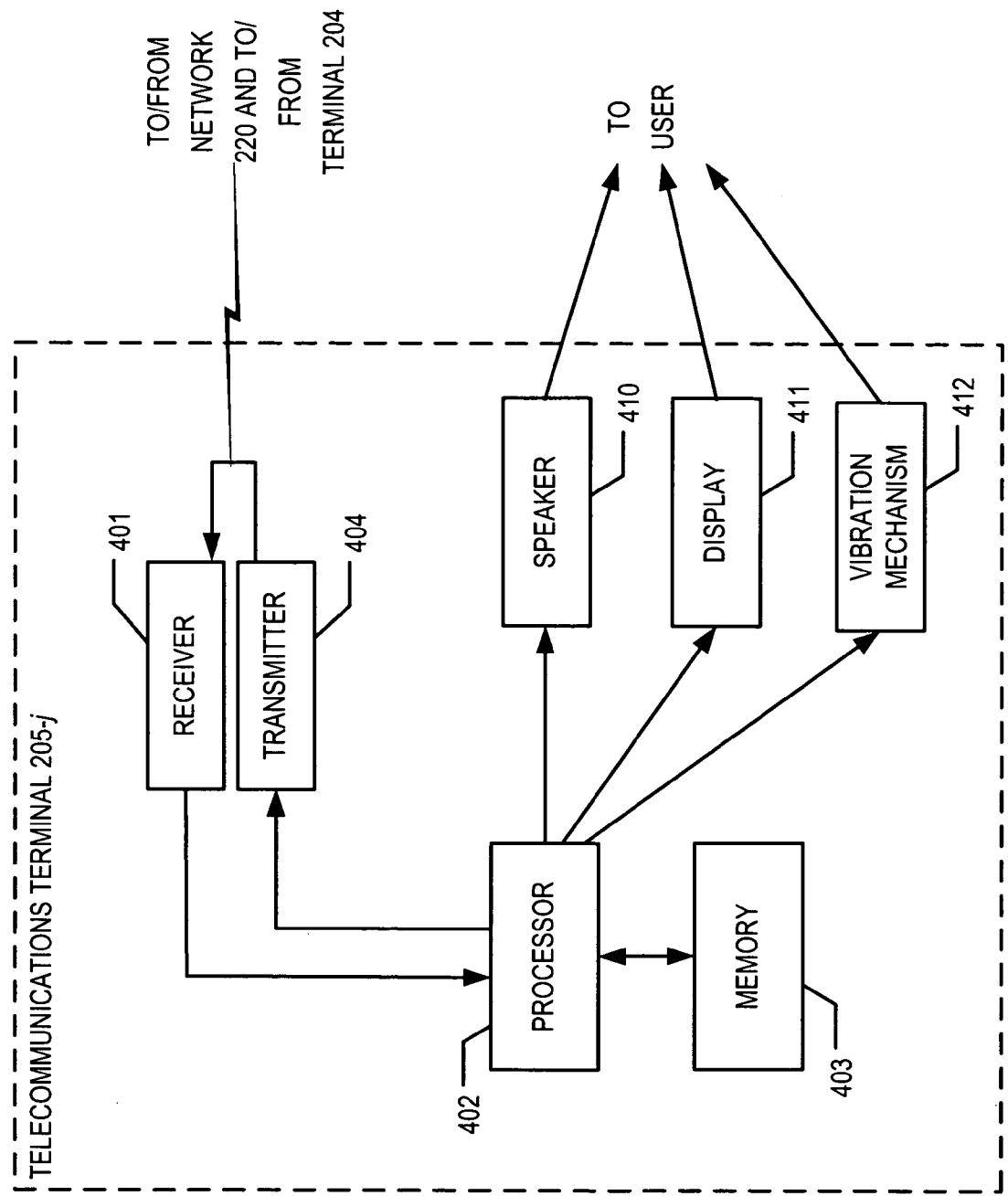
FIG. 4 depicts a block diagram of the salient components of telecommunications terminal 205-j, as shown in FIG. 2, in accordance with the illustrative embodiments of the present invention.

FIG. 4 depicts a block diagram of the salient components of terminal 205-j, in accordance with the illustrative embodiments of the present invention. As shown in FIG. 4, terminal 205-j comprises receiver 401, processor 402, memory 403, transmitter 404, speaker 410, display 411, and vibration mechanism 412, interconnected as shown.

Receiver 401 receives signals from one or both of primary terminal 204 and network 220, and forwards the information encoded in these signals to processor 402 in well-known fashion. In some alternative embodiments, receiver 401 comprises multiple receiver units, where terminal 205-j uses one receiver unit to communicate with primary terminal 204 and another receiver unit to communicate with network 220. It will be clear to those skilled in the art, after reading this disclosure, how to make and use receiver 401.

Processor 402 is a general-purpose processor that is capable of reading data from and writing data into memory 403 and of executing the tasks described below and with respect to FIGS. 7 and 10. In some alternative embodiments of the present invention, processor 402 might be a special-purpose processor. In either case, it will be clear to those skilled in the art, after reading this disclosure, how to make and use processor 402.

Memory 403 stores data and executable instructions, as is well-known in the art, and might be any combination of random-access memory (RAM), flash memory, disk, drive, etc. It will be clear to those skilled in the art, after reading this specification, how to make and use memory 403.

Transmitter 404 receives information from processor 402 and transmits signals that encode this information to one or both of primary terminal 204 and network 220, in well-known fashion. In some alternative embodiments, transmitter 404 comprises multiple transmitter units, where terminal 205-j uses one transmitter unit to communicate with primary terminal 204 and another transmitter unit to communicate with network 220. It will be clear to those skilled in the art, after reading this specification, how to make and use transmitter 404.

Speaker 410, display 411, and vibration mechanism 412 are the same as speaker 110-1, display 111-1, and vibration mechanism 112-1, as are known in the art. In some alternative embodiments, display 411 or vibration mechanism 412 or both might not be present.

The remainder of this specification describes a first illustrative embodiment and a second illustrative embodiment of the present invention. The first illustrative embodiment performs ringtone coordination across more than one telecommunications terminal, in part by primary terminal 204: (i) determining a first instance of a musical composition, where terminal 204 uses the first instance, and (ii) transmitting a second and third instance of the musical composition to terminals 205-1 and 205-2, respectively. The second illustrative embodiment also performs ringtone coordination across more than one telecommunications terminal, but does so in part by primary terminal 204: (i) determining a first value of a musical property, where primary terminal 204 uses the first value, and (ii) transmitting a second and third value of the musical property to terminals 205-1 and 205-2, respectively, where all three terminals have previously stored the same musical composition.

Figure 5:
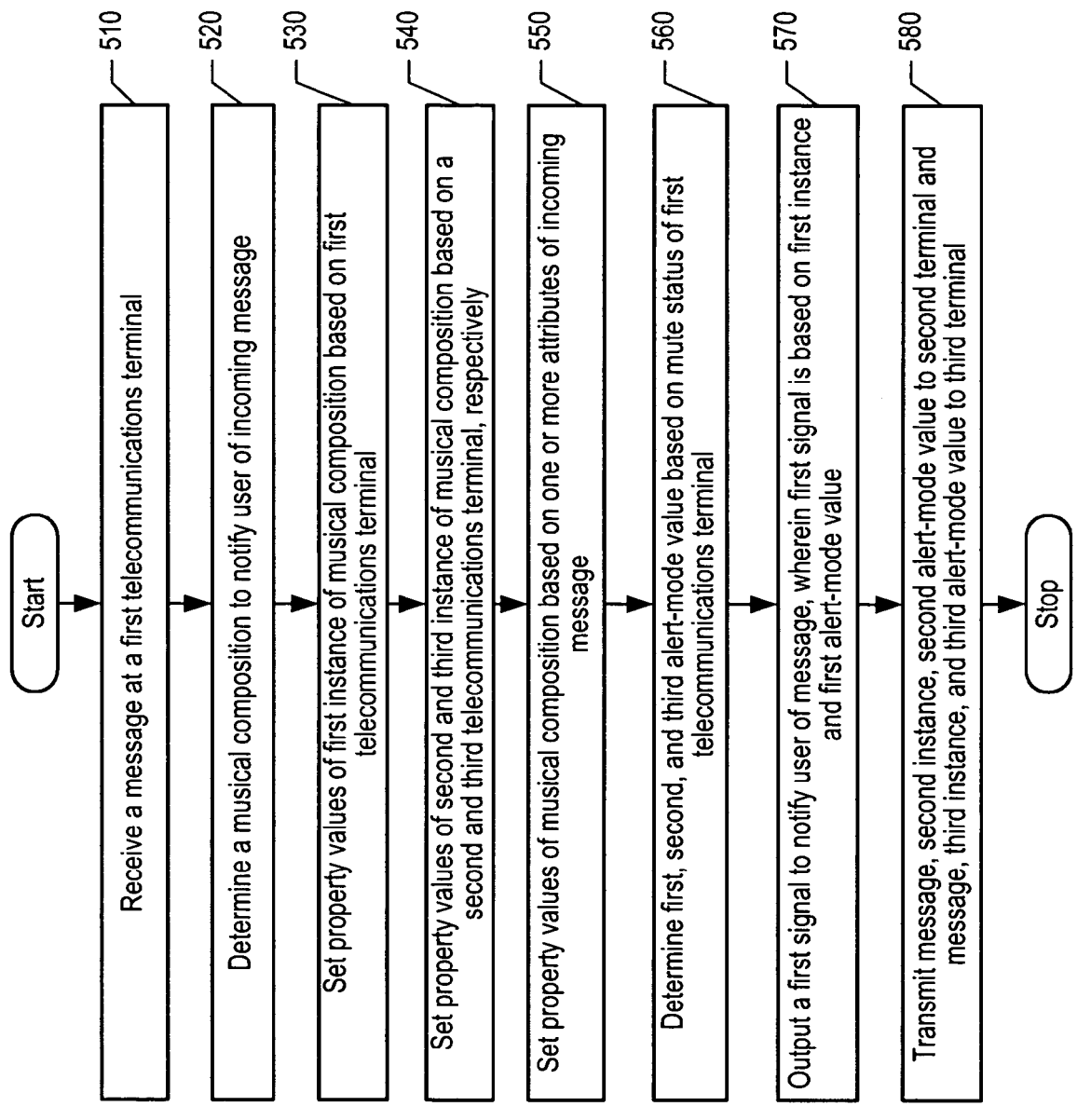
FIG. 5 depicts a flowchart of the salient tasks performed by primary telecommunications terminal 204, in accordance with the first illustrative embodiment of the present invention.

FIG. 5 depicts a flowchart of the salient tasks performed by primary terminal 204, also referred to as the first telecommunications terminal, in accordance with the first illustrative embodiment of the present invention. Primary terminal 204 interacts with terminal 205-1, also referred to as the second telecommunications terminal, and with terminal 205-2. It will be clear to those skilled in the art which tasks depicted in FIG. 5 can be performed simultaneously or in a different order than that depicted.

At task 510, receiver 301 receives from network 220 a message that is directed to primary terminal 204 and forwards the message to processor 302, in well-known fashion.

At task 520, processor 302 determines what musical composition will be used to notify the user associated with primary terminal 204, terminal 205-1, and terminal 205-2 of the arrival of the message. As will be appreciated by those skilled in the art, in some embodiments the "rules" that govern musical composition selection might be specified by the user and stored memory 303 of primary terminal 204, in well-known fashion. In some other embodiments, the calling terminal might piggyback a musical composition on outgoing messages. It will be clear to those skilled in the art how to select a musical composition.

At task 530, processor 302 sets the values of one or more properties of the musical composition that was determined at task 520, based on one or more attributes of primary terminal 204, as described in detail below and with respect to FIG. 6. These property values will be used by primary terminal 204 to determine how to play the musical composition. The properties selected are independent of melody.

At task 540, processor 302 sets the values of one or more properties of the musical composition that was determined at task 520, based on one or more attributes of terminal 205-1, as described in detail below and with respect to FIG. 6. These property values will be used by terminal 205-1 to determine how to play the musical composition. Furthermore, processor 302 sets the values of one or more properties of the musical composition that was determined at task 520, based on one or more attributes of terminal 205-2. These property values will be used by terminal 205-2 to determine how to play the musical composition. In some embodiments, the properties selected are the same as those selected at task 530.

At task 550, processor 302 sets the values of one or more properties of the musical composition that was determined at task 520, based on one or more attributes of the incoming message, as described in detail below and with respect to FIG. 6. These property values will be used by multiple terminals to determine how to play the musical composition.

At task 560, processor 302 determines a first alert-mode value, a second alert-mode value, and a third alert-mode value. The first alert-mode value indicates the method by which primary terminal 204 notifies the user of an incoming call. The second alert-mode value indicates the method by which terminal 205-1 notifies the user of an incoming call. The third alert-mode value indicates the method by which terminal 205-2 notifies the user of an incoming call. The method of notifying involves speaker 310, display 311, or vibration mechanism 312, or a combination of the three, in well-known fashion. Speaker 310 notifies the user by playing sound (e.g., a piece of music, a sound effect, etc.). Display 311 notifies the user by displaying a flashing icon, a flashing light, some other image, or text. Vibration mechanism 312 notifies the user through vibration.

Processor 302 determines the alert-mode values based on the mute status of primary terminal 204. For example, when the user of primary terminal 204 selects to mute speaker 310 or to enable (i.e., "unmute") speaker 310, processor 302 is made aware of the updated mute status. If the mute status is "muted," processor 302 sets the first, second, and third alert-mode values to indicate that speaker 310 has been silenced. If the mute status is "not muted," processor 302 sets the first, second, and third alert-mode values to indicate that speaker 310 has been enabled. It will be clear to those skilled in the art that the first, second, and third alert modes can indicate other alerting methods that will be used by primary terminal 204, terminal 205-1, and 205-2, respectively, where those other alerting methods are separate from or in addition to the alerting method that involves speaker 310.

At task 570, processor 302 outputs to speaker 310 a first signal for notifying the user of the incoming message, based on the first alert-mode value. For example, if the first alert-mode value indicates an audible alert, then processor 302 outputs the signal to speaker 310. If the first alert-mode value indicates to not use an audible alert, then processor 302 does not output the signal to speaker 310 and uses another means for alerting (e.g., display 311, vibration mechanism 312, etc.).

At task 580, transmitter 304 transmits the second instance of the musical composition and the second alert-mode value to terminal 205-1 in well-known fashion. Transmitter 304 also transmits the third instance of the musical composition and the third alert-mode value to terminal 205-2 in well-known fashion. In some embodiments, primary terminal 204 also forwards the incoming message to terminals 205-1 and 205-2, in well-known fashion. After task 580, the method of FIG. 5 terminates.

Figure 6:
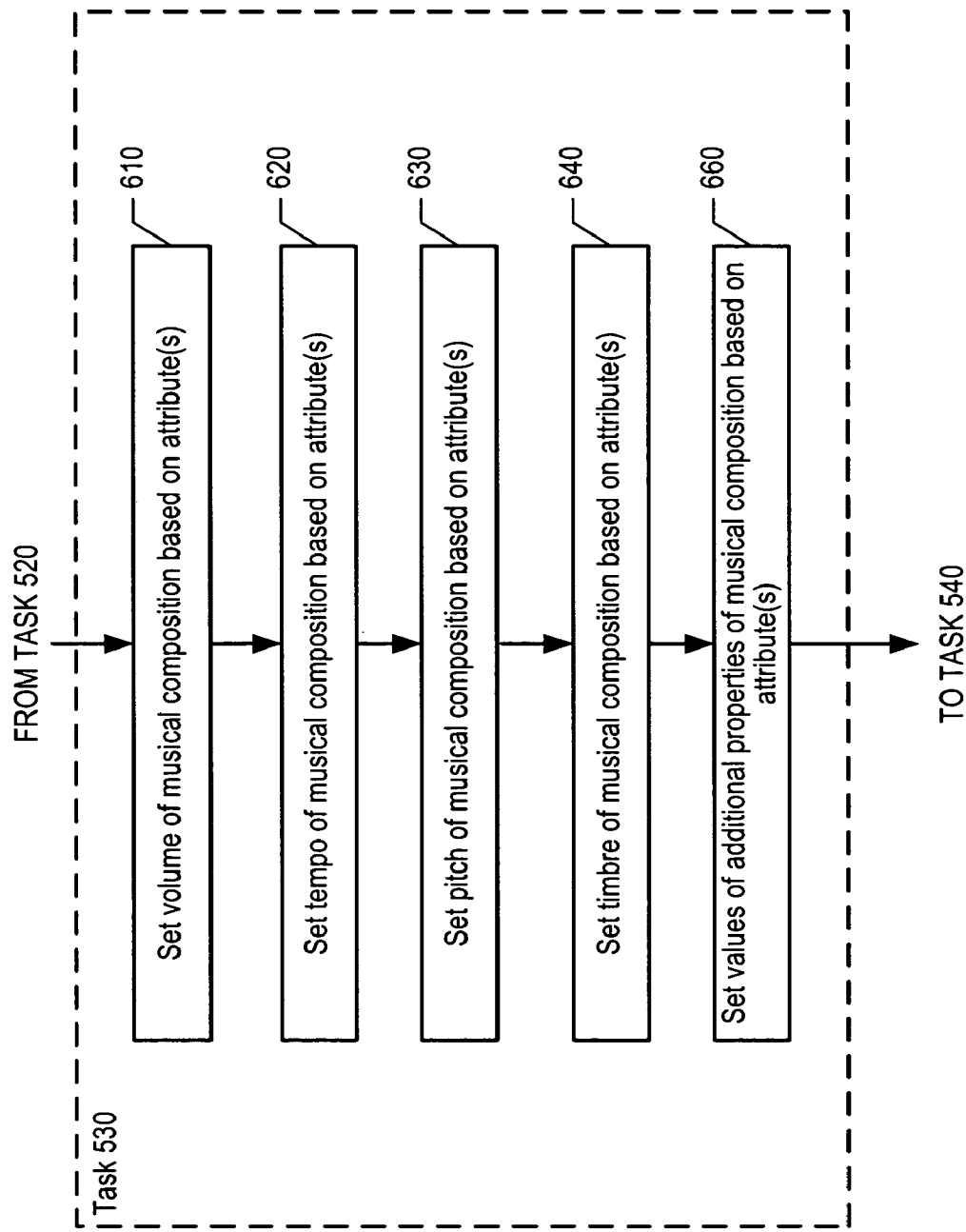
FIG. 6 depicts a detailed flowchart of task 530, as shown in FIG. 5, in accordance with the first illustrative embodiment of the present invention.

FIG. 6 depicts a detailed flowchart of task 530 in accordance with the first illustrative embodiment of the present invention. It will be clear to those skilled in the art which tasks depicted in FIG. 6 can be performed simultaneously or in a different order than that depicted.

At task 610, processor 302 sets the volume that primary terminal 204 will use in playing the selected musical composition, based on one or more attributes (e.g., terminal type, etc.) of primary terminal 204.

At task 620, processor 302 sets the tempo of the musical composition for primary terminal 204, based on one or more attributes of primary terminal 204.

At task 630, processor 302 sets the pitch (i.e., key signature) of the musical composition for primary terminal 204, based on one or more attributes of primary terminal 204.

At task 640, processor 302 sets the timbre (e.g., the musical instrument playing the composition, vocal versus instrumental composition, etc.) of the musical composition for primary terminal 204, based on one or more attributes of primary terminal 204.

At task 650, processor 302 sets the values of additional properties of the musical composition (e.g., harmony, rhythm, gender for vocal music, language for vocal music, etc.) for primary terminal 204, based on one or more attributes of primary terminal 204. After task 650, execution continues at task 540.

The tasks depicted in FIG. 6 also apply to task 540, except that one or more attributes of terminals 205-1 and 205-2 are considered. For example, processor 302 sets the volume that terminal 205-1 will use in playing the selected musical composition, based on one or more attributes (e.g., terminal type, etc.) of terminal 205-1. Similarly, processor 302 sets the volume that terminal 205-2 will use in playing the selected musical composition, based on one or more attributes (e.g., terminal type, etc.) of terminal 205-2.

The tasks depicted in FIG. 6 also apply to task 550, except that one or more attributes of the incoming message are considered. For example, processor 302 sets the volume of the musical composition based on one or more attributes of the message such as the identity of the sender of the message, a priority associated with the message, the location from which the message was sent, etc. As will be appreciated by those skilled in the art, setting volume based on the location from which the message was sent is possible only in telecommunications systems that provide such information to terminals.

Figure 7:
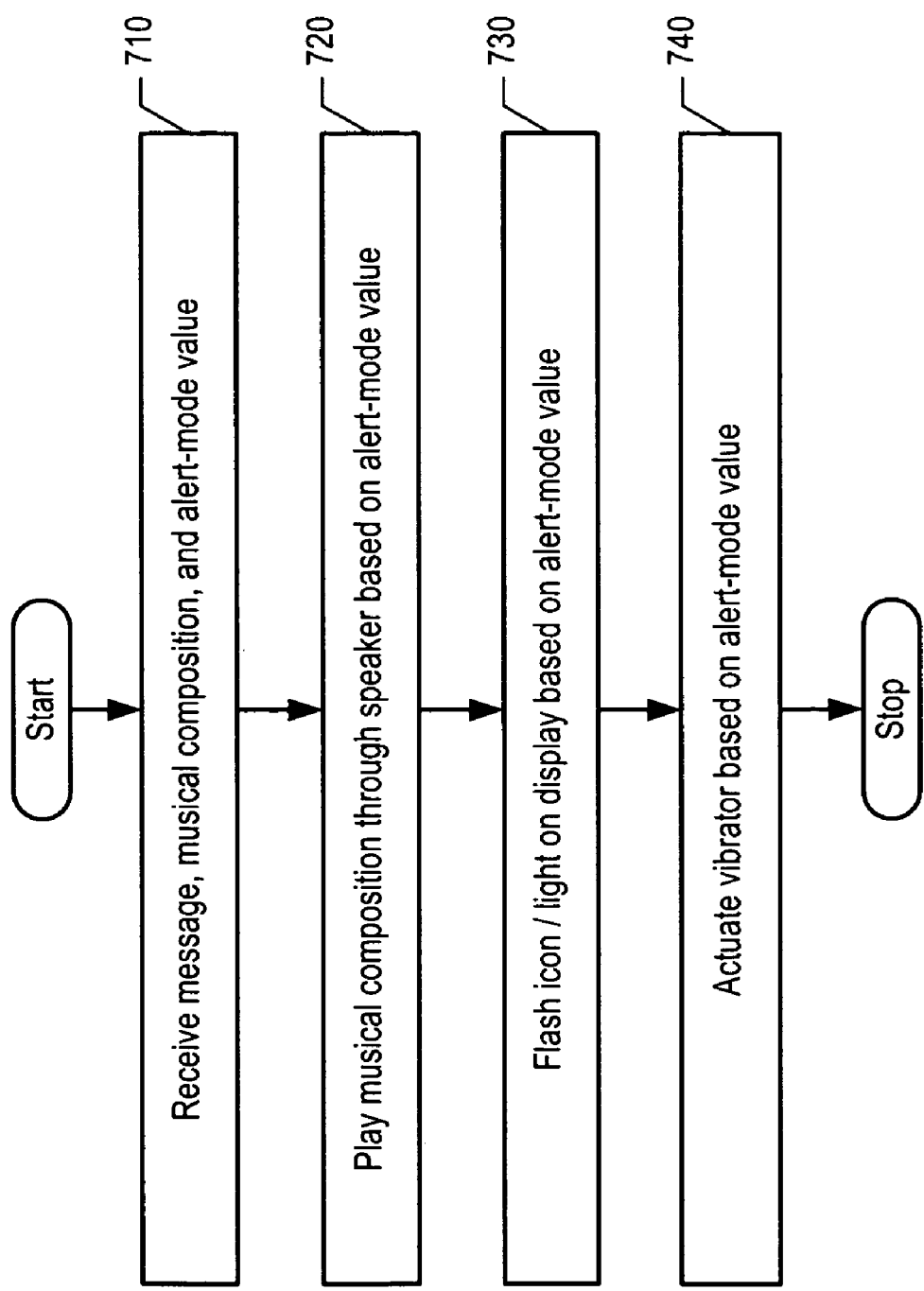
FIG. 7 depicts a flowchart of the salient tasks performed by telecommunications terminal 205-j, in accordance with the first illustrative embodiment of the present invention.

FIG. 7 depicts a flowchart of the salient tasks of terminal 205-j, in accordance with the first illustrative embodiment of the present invention. It will be clear to those skilled in the art which tasks depicted in FIG. 7 can be performed simultaneously or in a different order than that depicted.

At task 710, receiver 401 of terminal 205-j receives the message from network 220 in well-known fashion. Receiver 401 also receives the $(j+1)^{th}$ instance of the musical composition and the $(j+1)^{th}$ alert-mode value from primary terminal 204 in well-known fashion.

In some alternative embodiments, receiver 401 of terminal 205-j receives the message from primary terminal 204 in well-known fashion, instead of from network 220.

At task 720, processor 402 of terminal 205-j sends a signal to speaker 310 to play the musical composition, provided that the alert-mode value indicates that the speaker is enabled.

At task 730, processor 402 of terminal 205-j sends a signal to display 311 to indicate the arrival of the incoming message, provided that the alert-mode value indicates to do so.

At task 740, processor 402 of terminal 205-j sends a signal that actuates vibration mechanism 312, provided that the alert-mode value indicates to do so. After task 940, the method of FIG. 7 terminates.

Figure 8:
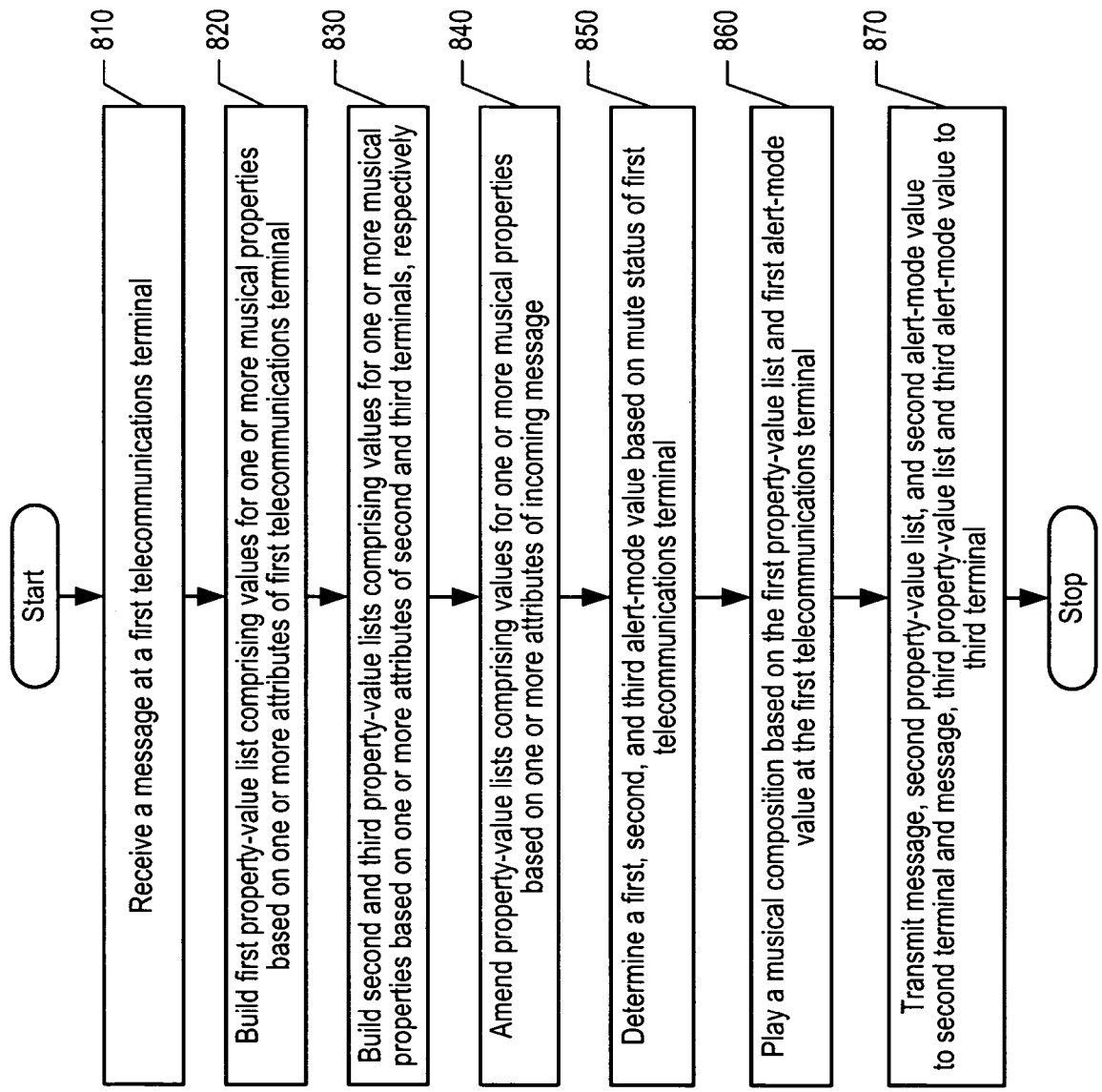
FIG. 8 depicts a flowchart of the salient tasks performed by primary telecommunications terminal 204, in accordance with the second illustrative embodiment of the present invention.

FIG. 8 depicts a flowchart of the salient tasks performed by primary terminal 204, in accordance with the second illustrative embodiment of the present invention. In the second illustrative embodiment, primary terminal 204, also known as the first telecommunications terminal, determines the property values for the musical composition, instead of building the musical composition itself. Terminals 205-1 and 205-2 then use the property values to determine how to play the musical composition, which is stored locally in terminals 205-1 and 205-2. Terminal 205-1 is also known as the second telecommunications terminal.

It will be clear to those skilled in the art which tasks depicted in FIG. 8 can be performed simultaneously or in a different order than that depicted.

At task 810, receiver 301 receives a message directed to primary terminal 204 and forwards the message to processor 302, in well-known fashion.

At task 820, processor 302 builds a first property-value list that comprises values for one or more properties of music based on one or more attributes of primary terminal 204, as described in detail below and with respect to FIG. 9. The properties selected are independent of melody.

At task 830, processor 302 builds a second property-value list that comprises values for one or more properties of music based on one or more attributes of terminal 205-1, as described in detail below and with respect to FIG. 9. Furthermore, processor 302 builds a third property-value list that comprises values for one or more properties of music based on one or more attributes of terminal 205-2. In some embodiments, the properties selected are the same as those selected at task 820.

At task 840, processor 302 amends the first, second, and third property-value lists, based on one or more attributes of the incoming message, as described in detail below and with respect to FIG. 9.

At task 850, processor 302 determines a first, second, and third alert-mode value. The first alert-mode value indicates the method by which primary terminal 204 notifies the user of an incoming call. The second alert-mode value indicates the method by which terminal 205-1 notifies the user of an incoming call. The method of notifying involves speaker 310, display 311, or vibration mechanism 312, or a combination of the three, in well-known fashion. Speaker 310 notifies the user by playing sound (e.g., a piece of music, a sound effect, etc.). Display 311 notifies the user by displaying a flashing icon, a flashing light, some other image, or text. Vibration mechanism 312 notifies the user through vibration.

Processor 302 determines the alert-mode values based on the mute status of primary terminal 204. Processor 302 receives the mute status in well-known fashion. For example, when the user of primary terminal 204 selects to mute speaker 310 or to enable (i.e., "unmute") speaker 310, processor 302 updates the mute status. If the mute status is "muted," processor 302 sets the first, second, and third alert-mode values to indicate that speaker 310 has been silenced. If the mute status is "not muted," processor 302 sets the first, second, and third alert-mode values to indicate that speaker 310 is enabled. It will be clear to those skilled in the art that the first, second, and third alert modes can indicate other alerting methods to be used by primary terminal 204, terminal 205-1, and terminal 205-2, respectively, where those other alerting methods are separate from or in addition to the alerting method involving speaker 310.

At task 860, processor 304 plays through speaker 310 the musical composition in well-known fashion, based on the first property-value list and based on the first alert-mode value. For example, the musical composition might be played to sound as if sung by a female vocalist. As another example, the musical composition might not be played at all if the alert mode is non-acoustic. If the first alert-mode value indicates to not use an audible alert, then processor 302 uses another means for alerting (e.g., display 311, vibration mechanism 312, etc.).

At task 870, transmitter 304 transmits the second property-value list, and the second alert-mode value to terminal 205-1 in well-known fashion. Transmitter 304 also transmits the third property-value list and the third alert-mode value to terminal 205-2 in well-known fashion. In some embodiments, primary terminal 204 also forwards the incoming message to terminals 205-1 and 205-2, in well-known fashion. After task 870, the method of FIG. 8 terminates.

Figure 9:
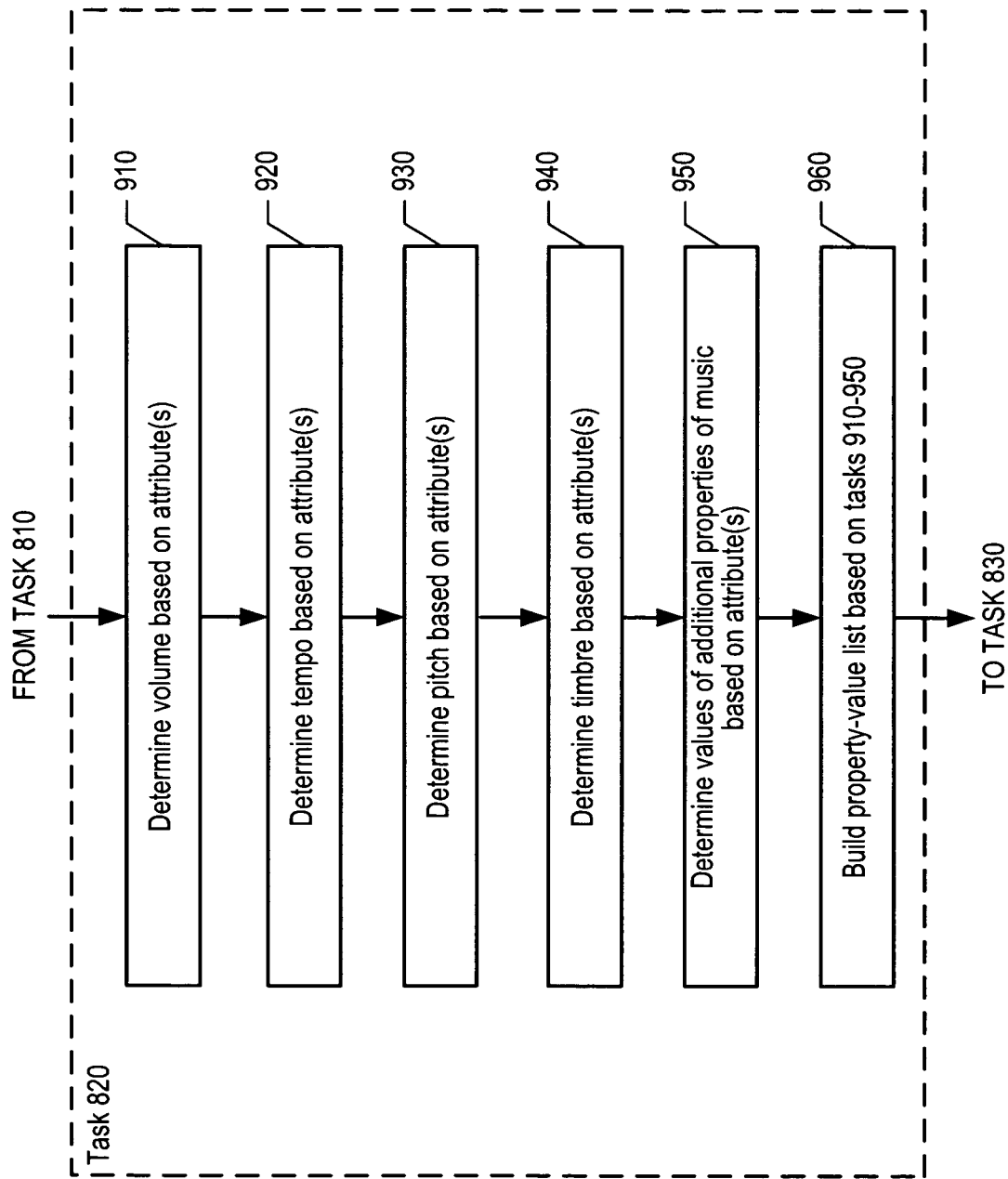
FIG. 9 depicts a detailed flowchart of task 820, as shown in FIG. 8, in accordance with the second illustrative embodiment of the present invention.

FIG. 9 depicts a detailed flowchart of task 820 in accordance with the second illustrative embodiment of the present invention. It will be clear to those skilled in the art which tasks depicted in FIG. 9 can be performed simultaneously or in a different order than that depicted.

At task 910, processor 302 determines the volume that primary terminal 204 will use in playing the locally-stored musical composition, based on one or more attributes (e.g., terminal type, etc.) of primary terminal 204.

At task 920, processor 302 determines the tempo of the musical composition for primary terminal 204, based on one or more attributes of primary terminal 204.

At task 930, processor 302 determines the pitch (i.e., key signature) of the musical composition for primary terminal 204, based on one or more attributes of primary terminal 204.

At task 940, processor 302 determines the timbre (e.g., the musical instrument playing the composition, vocal versus instrumental composition, etc.) of the musical composition for primary terminal 204, based on one or more attributes of primary terminal 204.

At task 950, processor 302 determines the values of additional properties of the musical composition (e.g., harmony, rhythm, gender for vocal music, language for vocal music, etc.) for primary terminal 204, based on one or more attributes of primary terminal 204.

At task 960, processor 302 builds a first property-value list based on tasks 910 through 950. After task 960, execution continues at task 830.

The tasks depicted in FIG. 9 also apply to task 830, except that (i) one or more attributes of terminal 205-1 are considered in building a second property-value list and (ii) one or more attributes of terminal 205-2 are considered in building a third property-value list. For example, processor 302 determines the volume that terminal 205-1 will use in playing the locally-stored musical composition, based on one or more attributes (e.g., terminal type, etc.) of terminal 205-1.

The tasks depicted in FIG. 9 also apply to task 840, except that one or more attributes of the incoming message are considered in amending the first, second, and third property-value lists. For example, processor 302 determines the volume of the musical composition based on one or more attributes of the message such as the identity of the sender of the message, a priority associated with the message, the location from which the message was sent, etc. As will be appreciated by those skilled in the art, setting volume based on the location from which the message was sent is possible only in telecommunications systems that provide such information to terminals.

Figure 10:
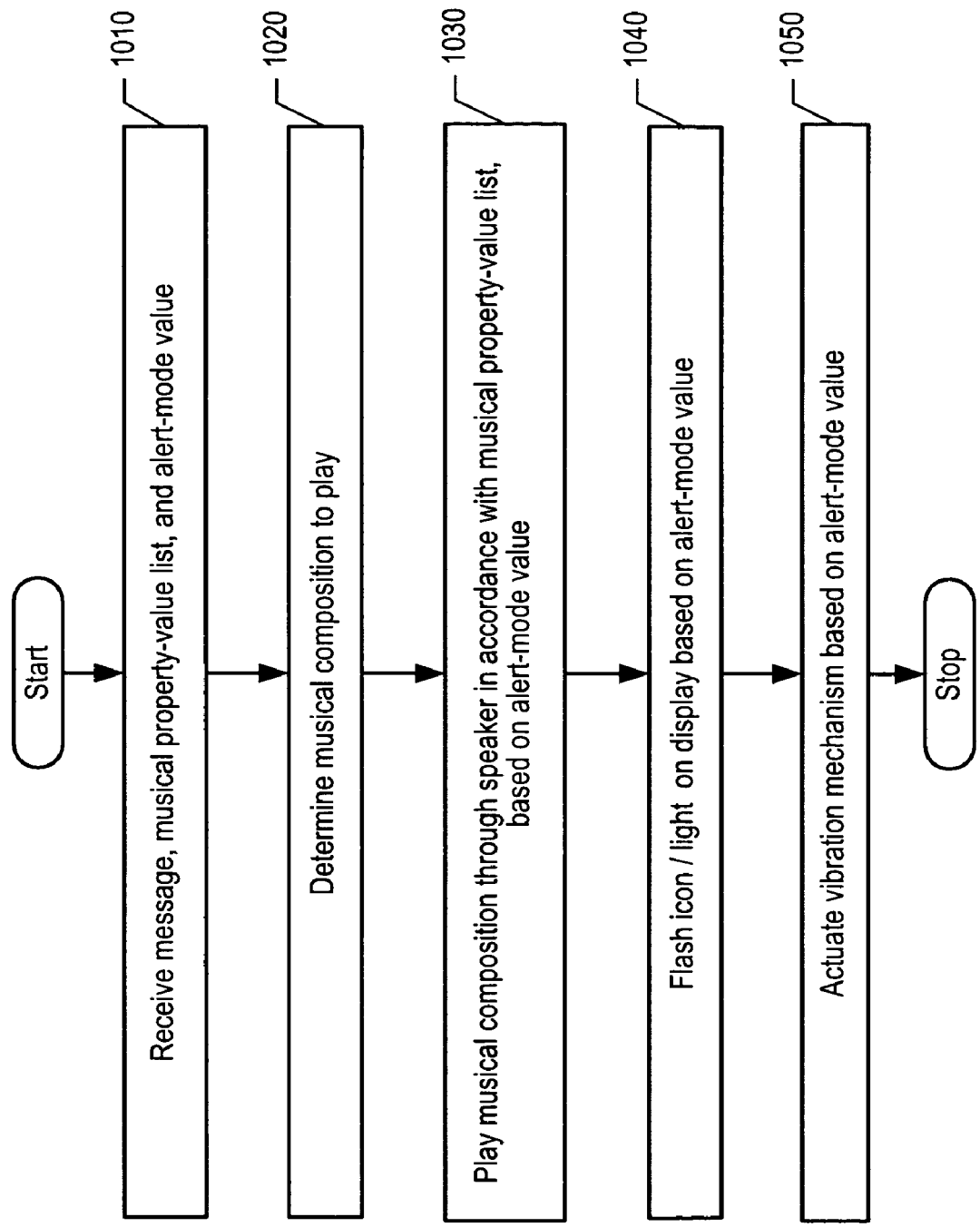
FIG. 10 depicts a flowchart of the salient tasks performed by telecommunications terminal 205-j, in accordance with the second illustrative embodiment of the present invention.

FIG. 10 depicts a flowchart of the salient tasks of terminal 205-j, for j=1 to 2, in accordance with the second illustrative embodiment of the present invention. It will be clear to those skilled in the art which tasks depicted in FIG. 10 can be performed simultaneously or in a different order than that depicted.

At task 1010, receiver 401 of terminal 205-j receives the message from network 220 in well-known fashion. Receiver 401 also receives the $(j+1)^{th}$ property value list and the $(j+1)^{th}$ alert-mode value from primary terminal 204 in well-known fashion.

In some alternative embodiments, receiver 401 of terminal 205-j receives the message from primary terminal 204 in well-known fashion, instead of from network 220.

At task 1020, processor 402 of terminal 205-j determines what musical composition to play for notifying the user of the arrival of the message, in well-known fashion. In accordance with the illustrative embodiment of the present invention, terminals 205-1 and 205-2 select the same musical composition as does primary terminal 204 because all terminals use the same method for determining the musical composition, which has been stored previously in both terminals (e.g., provisioned at the factory, downloaded by the user or an administrator, etc.).

At task 1030, processor 402 of terminal 205-j sends a signal to speaker 410 to play the musical composition, provided that the alert-mode value indicates that the speaker is enabled. Processor 402 generates, in well-known fashion, the signal so that the musical composition plays in accordance with the musical property-value list received at task 1010.

At task 1040, terminal 205-j sends a signal to display 411 to indicate the arrival of the incoming message, provided that the alert-mode value indicates to do so.

At task 1050, terminal 205-j sends a signal that actuates vibration mechanism 412, provided that the alert-mode value indicates to do so. After task 1050, the method of FIG. 10 terminates.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
   (a) receiving, at a first telecommunications terminal, a message directed to a user who is associated with said first telecommunications terminal and with a second telecommunications terminal;
   (b) outputting, at said first telecommunications terminal, a first signal to notify said user of the arrival of said message, wherein said first signal is based on a first instance of a predetermined musical composition; and
   (c) transmitting, from said first telecommunications terminal to said second telecommunications terminal, a second signal that is based on a second instance of said predetermined musical composition, the transmission being based on the reception of said message;
   wherein the value of a first musical property of said first instance is based on an attribute of said first telecommunications terminal; and
   wherein the value of said first musical property of said second instance is based on an attribute of said second telecommunications terminal; and
   wherein said first musical property is independent of melody.

2. The method of claim 1 further comprising receiving an acknowledgement message from said second telecommunications terminal after the transmitting of said second signal.

3. The method of claim 1 wherein the value of a second musical property of said first instance is based on an attribute of said message.

4. The method of claim 1 wherein said first musical property is one of pitch, timbre, harmony and rhythm.

5. The method of claim 1 wherein said first musical property is one of volume, tempo, and dynamic range.

6. The method of claim 1 wherein said first musical property is for vocal music and is one of gender and language.

7. The method of claim 1 wherein said second signal is one of an audio clip and a Musical Instrument Digital Interface file.

8. The method of claim 1 wherein said attribute of said first telecommunications terminal is terminal type and wherein said terminal type is one of cellular phone, POTS phone, ISDN phone, and PBX phone.

9. The method of claim 1 wherein said attribute of said first telecommunications terminal is terminal type, and wherein said terminal type is one of hardphone and softphone.

10. A method comprising:
(a) receiving at a second telecommunications terminal:
  (i) a first signal that represents an instance of a predetermined musical composition, from a first telecommunications terminal, and
  (ii) a message directed to a user who is associated with said first telecommunications terminal and with said second telecommunications terminal, via a path that bypasses said first telecommunications terminal; and
(b) outputting a second signal based on said first signal to notify said user of the arrival of said message;
wherein the value of a first musical property of said instance is based on an attribute of said second telecommunications terminal; and
wherein said first musical property is independent of melody.

11. The method of claim 10 further comprising transmitting an acknowledgement message to said first telecommunications terminal after the receiving of said first signal.

12. The method of claim 10 wherein said first musical property is one of pitch, timbre, harmony and rhythm.

13. A method comprising:
(a) receiving, at a first telecommunications terminal, a message directed to a user who is associated with said first telecommunications terminal and with a second telecommunications terminal;
(b) playing, at said first telecommunications terminal, a predetermined musical composition in accordance with a first value for a first musical property, wherein said predetermined musical composition is for notifying said user of the arrival of said message; and
(c) transmitting, from said first telecommunications terminal to said second telecommunications terminal, a second value for said first musical property, the transmission being based on the reception of said message;
wherein said first value is based on an attribute of said first telecommunications terminal and said second value is based on an attribute of said second telecommunications terminal; and
wherein said first musical property is independent of melody.

14. The method of claim 13 further comprising (d) receiving an acknowledgement message from said second telecommunications terminal after the transmitting of said second value.

15. The method of claim 13 wherein the value of a second musical property is based on an attribute of said message.

16. The method of claim 13 wherein said first musical property is one of pitch, timbre, harmony and rhythm.

17. The method of claim 13 wherein said first musical property is one of volume, tempo, and dynamic range.

18. The method of claim 13 wherein said first musical property is for vocal music and is one of gender and language.

19. The method of claim 13 wherein said attribute of said first telecommunications terminal is terminal type, and wherein said terminal type is one of cellular phone, POTS phone, ISDN phone, and PBX phone.

20. The method of claim 13 wherein said attribute of said first telecommunications terminal is terminal type, and wherein said terminal type is one of hardphone and softphone.

21. A method comprising:
(a) receiving at a second telecommunications terminal:
  (i) a value for a first musical property, from a first telecommunications terminal, and
  (ii) a message directed to a user who is associated with said first telecommunications terminal and with said second telecommunications terminal, via a path that bypasses said first telecommunications terminal; and
(b) playing a predetermined musical composition in accordance with said value to notify said user of the arrival of said message;
wherein said value is based on an attribute of said second telecommunications terminal; and
wherein said first musical property is independent of melody.

22. The method of claim 21 further comprising transmitting an acknowledgement message to said first telecommunications terminal after the receiving of said value.

23. The method of claim 21 wherein said first musical property is one of pitch, timbre, harmony and rhythm.

24. A method comprising:
(a) receiving, at a first telecommunications terminal, a message directed to a user who is associated with said first telecommunications terminal and with a second telecommunications terminal;
(b) notifying, via the method that is indicated by a first alert-mode value, said user of the arrival of said message; and
(c) transmitting a second alert-mode value, from said first telecommunications terminal to said second telecommunications terminal, wherein said second alert-mode value is for indicating the method by which said user is notified of the arrival of said message at said second telecommunications terminal;
wherein said first alert-mode value and said second alert-mode value are based on the mute status of said first telecommunications terminal.

25. The method of claim 24 wherein said first alert-mode value indicates one of a flashing icon and a flashing light.

26. The method of claim 24 wherein said first alert-mode value indicates vibration.

27. The method of claim 24 further comprising (d) determining a first value of a property of a predetermined musical composition wherein said first value of said property is based on the terminal type of said first telecommunications terminal.

* * * * *